US011138956B2

(12) United States Patent
Peng et al.

(10) Patent No.: US 11,138,956 B2
(45) Date of Patent: Oct. 5, 2021

(54) METHOD FOR CONTROLLING DISPLAY OF TERMINAL, STORAGE MEDIUM, AND ELECTRONIC DEVICE

(71) Applicant: Guangdong Oppo Mobile Telecommunications Corp., Ltd., Guangdong (CN)

(72) Inventors: Deliang Peng, Guangdong (CN); Yongpeng Yi, Guangdong (CN); Shengjun Gou, Guangdong (CN); Xiaori Yuan, Guangdong (CN); Gaoting Gan, Guangdong (CN); Zhiyong Zheng, Guangdong (CN); Hai Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/566,008

(22) Filed: Sep. 10, 2019

(65) Prior Publication Data
US 2020/0005737 A1 Jan. 2, 2020

Related U.S. Application Data

(63) Continuation of application No. PCT/CN2017/106943, filed on Oct. 19, 2017.

(30) Foreign Application Priority Data

Mar. 10, 2017 (CN) .......................... 201710142972.8

(51) Int. Cl.
*G09G 5/377* (2006.01)
*G06F 1/3218* (2019.01)
(Continued)

(52) U.S. Cl.
CPC ........... *G09G 5/377* (2013.01); *G06F 1/3218* (2013.01); *G06F 3/041* (2013.01); *G06F 11/3438* (2013.01)

(58) Field of Classification Search
None
See application file for complete search history.

(56) References Cited

U.S. PATENT DOCUMENTS

| 2011/0213655 A1* | 9/2011 | Henkin | ............. G06Q 30/0251 705/14.49 |
| 2015/0121266 A1* | 4/2015 | Gao | ...................... G06F 1/1694 715/765 |

(Continued)

FOREIGN PATENT DOCUMENTS

| CN | 103631480 A | 3/2014 |
| CN | 104267893 A | 1/2015 |

(Continued)

OTHER PUBLICATIONS

International search report issued in corresponding international application No. PCT/CN2017/106943 dated Jan. 18, 2018.
(Continued)

*Primary Examiner* — Yi Wang
(74) *Attorney, Agent, or Firm* — Young Basile Hanlon & MacFarlane, P.C.

(57) ABSTRACT

A method for controlling display of a terminal, an electronic device and a non-transitory computer readable storage medium are provided. The method includes the following. A target object is determined in a first display scenario, where the first display scenario contains display content of at least two objects. The number of times display content of a first object being prevented from being displayed in a predetermined period is obtained. If the number of times reaches a preset threshold corresponding to the first display scenario,
(Continued)

the display of the display content of the first object is blocked in the first display scenario.

15 Claims, 6 Drawing Sheets

(51) Int. Cl.
*G06F 3/041* (2006.01)
*G06F 11/34* (2006.01)

(56) References Cited

U.S. PATENT DOCUMENTS

| | | |
|---|---|---|
| 2015/0121306 A1 | 4/2015 | Fundament et al. |
| 2016/0092081 A1 | 3/2016 | Reichle |
| 2019/0064893 A1* | 2/2019 | Kumar .................. G06F 1/3296 |

FOREIGN PATENT DOCUMENTS

| | | |
|---|---|---|
| CN | 104298432 A | 1/2015 |
| CN | 104714725 A | 6/2015 |
| CN | 105100444 A | 11/2015 |
| CN | 106095592 A | 11/2016 |
| CN | 106162251 A | 11/2016 |
| CN | 106202472 A | 12/2016 |
| CN | 106406864 A | 2/2017 |

OTHER PUBLICATIONS

Extended European search report issued in corresponding European application No. 17899776.3 dated Feb. 4, 2020.
Indian First Examination Report for IN Application 201917037843 dated Apr. 26, 2021. (5 pages).

* cited by examiner

METHOD FOR CONTROLLING DISPLAY OF TERMINAL, STORAGE MEDIUM, AND ELECTRONIC DEVICE

CROSS-REFERENCE TO RELATED APPLICATION(S)

This application is a continuation of International application No. PCT/CN2017/106943, filed on Oct. 19, 2017, which claims priority to Chinese Patent Application No. 201710142972.8, filed on Mar. 10, 2017, the disclosures of both of which are hereby incorporated by reference in their entireties.

TECHNICAL FIELD

This disclosure relates to the field of display technologies, and more particularly to a method for controlling display of a terminal, a storage medium, and an electronic device.

BACKGROUND

At present, with the rapid development of terminal technologies, the size of a display screen of the terminal is getting increasingly larger, applications installed and functions thereof that can be achieved are more and more diversified, and a user spends a lot of time every day using the terminal. Therefore, display efficiency and power consumption of the terminal have become important indicators for measuring the performance of the terminal.

A display control scheme of the terminal has a great influence on the display efficiency and power consumption of the terminal.

SUMMARY

In implementations of the disclosure, a method for controlling display of a terminal, a storage medium, and an electronic device are provided.

According to a first aspect of the disclosure, a method for controlling display of a terminal is provided. The method includes the following. A target object is determined in a first display scenario, where the first display scenario contains display content of at least two objects, and each of the at least two objects includes an application, a layer, or a display region. The number of times display content of a first object being prevented from being displayed in a predetermined period is obtained, where the first object is any object other than the target object in all objects in the first display scenario. The display of the display content of the first object is blocked in the first display scenario, when the number of times reaches a preset threshold corresponding to the first display scenario.

According to a second aspect of the disclosure, an electronic device is provided. The electronic device includes a memory and a processor. The processor is configured to invoke computer programs stored in the memory to perform the following. A target object is determined in a first display scenario, where the first display scenario contains display content of at least two objects, and each of the at least two objects includes an application, a layer, or a display region. The number of times display content of a first object being prevented from being displayed in a predetermined period is obtained, where the first object is any object other than the target object in all objects in the first display scenario. The display of the display content of the first object is blocked in the first display scenario, when the number of times reaches a preset threshold corresponding to the first display scenario.

According to a third aspect of the disclosure, a non-transitory computer readable storage medium, being configured to store computer programs which, when executed by a computer, are operable with the computer to: determine, in a first display scenario, a target object, where the first display scenario contains display content of at least two objects, and each of the at least two objects comprises an application, a layer, or a display region; obtain the number of times display content of a first object being prevented from being displayed in a predetermined period, where the first object is any object other than the target object in all objects in the first display scenario; block, in the first display scenario, the display of the display content of the first object when the number of times reaches a preset threshold corresponding to the first display scenario.

DETAILED DESCRIPTION

Figure 1:
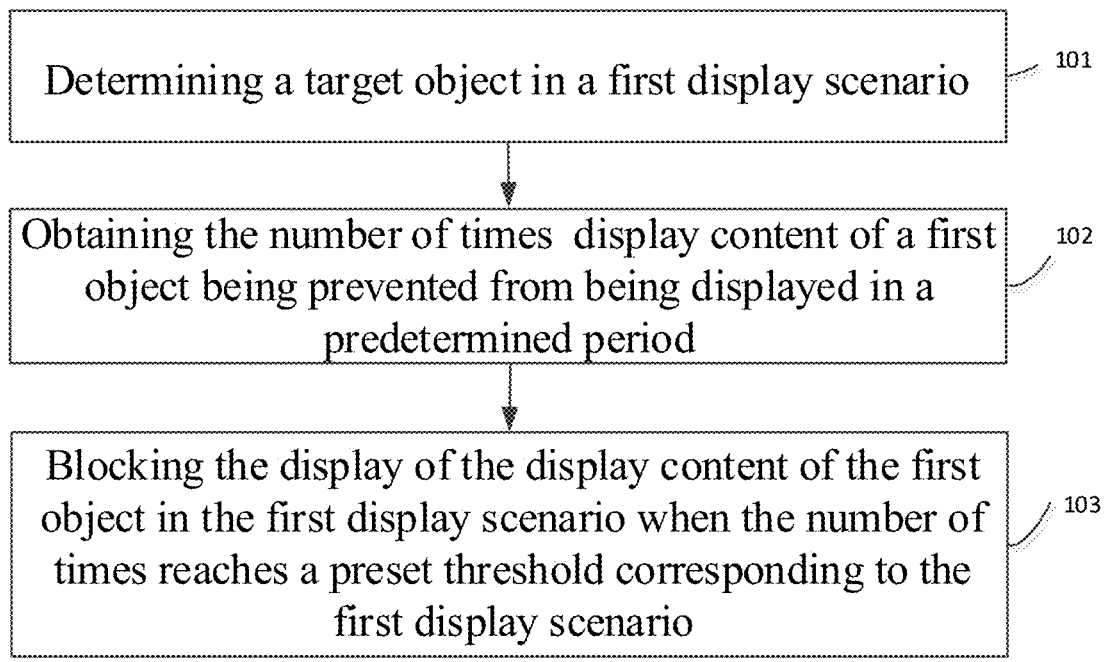
FIG. 1 is a schematic flowchart illustrating a method for controlling display of a terminal according to a first implementation of the disclosure.

Technical solutions of the disclosure will be further described below through implementations with reference to the accompanying drawings. It will be appreciated that the implementations are described herein for the purpose of explaining the disclosure rather than limiting the disclosure. In addition, it should be noted that, for the convenience of description, only some rather than all structures related to the disclosure are illustrated in the accompanying drawings.

Before discussing the example implementations in more detail, it should be mentioned that some example implementations are described as processes or methods of a flowchart. In the flowchart, although each step is depicted as being processed sequentially, some of these steps may be performed in parallel, concurrently, or simultaneously. In addition, the order of the steps can be rearranged. The process of one step may be terminated when a corresponding operation is completed, but the implementations may also have additional steps that are not illustrated in the drawings. The process may correspond to a method, a function, a procedure, a subroutine, a subprogram, and the like.

A method for controlling display of a terminal is provided. The method includes the following. A target object is determined in a first display scenario, where the first display scenario contains display content of at least two objects, and each of the at least two objects includes an application, a layer, or a display region. The number of times display content of a first object being prevented from being displayed in a predetermined period is obtained, where the first object is any object other than the target object in all objects in the first display scenario. The display of the display content of the first object is blocked in the first display scenario, when the number of times reaches a preset threshold corresponding to the first display scenario.

In one implementation, the target object is determined in the first display scenario as follows. A display level for each of the at least two objects in the first display scenario is determined in the first display scenario according to identity attributes of each of the at least two objects and an object with the highest display level is determined as the target object. Alternatively, a display area of each of the at least two objects in the first display scenario is calculated in the first display scenario and an object with the largest display area is determined as the target object.

In one implementation, the display of the display content of the first object is blocked in the first display scenario when the number of times reaches the preset threshold corresponding to the first display scenario as follows. The preset threshold corresponding to the first display scenario is determined according to a current time point. The display of the display content of the first object is blocked in the first display scenario when the number of times reaches the preset threshold corresponding to the first display scenario.

In one implementation of the disclosure, the display of the display content of the first object is blocked in the first display scenario as follows. When the first object is an application, a layer of the first object is forbidden from being added to a set of layers to be synthesized in the first display scenario or the first object in the first display scenario is closed. Alternatively, when the first object is a layer, the first object is forbidden from being added to the set of layers to be synthesized in the first display scenario. Alternatively, when the first object is a display region, the first object is removed from a layer of the first object in the first display scenario and via a layer synthesis module or an application corresponding to the first object is notified to stop rendering the display content of the first object in the layer of the first object.

In one implementation, after blocking, in the first display scenario, the display of the display content of the first object, the following can be conducted. Upon detecting in the first display scenario that a display recovery event is triggered, the display content of the first object is displayed in the first display scenario.

In one implementation, the first object is removed from the layer of the first object in the first display scenario and via the layer synthesis module as follows. Coordinates of the first object are obtained in the first display scenario and via the layer synthesis module, and the first object is removed according to the coordinates during layer synthesis.

In one implementation, the display content of the first object is displayed in the first display scenario, upon detecting in the first display scenario that the display recovery event is triggered as follows. Determine that the display recovery event is triggered, upon detecting in the first display scenario that a preset button is triggered in a preset manner. The display content of the first object is displayed in the first display scenario according to the display recovery event.

FIG. 1 is a schematic flowchart illustrating a method for controlling display of a terminal according to a first implementation of the disclosure. The method can be implemented by an apparatus for controlling display of a terminal. The apparatus can be implemented with software and/or hardware and can generally be integrated into the terminal. As illustrated in FIG. 1, the method begins at block 101.

A t block 101, a target object is determined in a first display scenario.

In one implementation, the first display scenario contains display content of at least two objects, and each of the at least two objects includes an application, a layer, or a display region.

In one example, the terminal in implementations of the disclosure may be a device with a display screen, such as a mobile phone, a smart watch, a tablet computer, a game machine, a personal digital assistant, and a digital multimedia player.

In one example, a display interface of the terminal sometimes contains display content of multiple objects. The "object" referred to herein can be an application (APP), a layer, or a display region. In general, one application may contain one or more layers and each layer may contain one or more display regions. For example, the object is an application. Assuming that a user launches a traffic measurement ball (application A) and a browser (application B), then display content (such as a traffic icon) of the application A and display content (such as a web page) of the application B can be presented in the display interface at the same time. For another example, the object is a layer. Assuming that an advertisement appears at the bottom of a web page when the user uses a browser, the web page and the advertisement may correspond to different layers. For yet another example, the object is a display region. Assuming that a user launches a video playing application, an advertisement appears in the bottom left corner when the user is watching a video, and the advertisement and a user interface (UI) control are in the same layer, then the display interface can be divided into different display regions, where the advertisement corresponds to a display region, the UI control corresponds to another display region, a video picture corresponds to another display region, a bullet screen corresponds to another display region, and each display region can be overlapped.

In one example, according to implementations of the disclosure, different display scenarios can be distinguished from each other according to the number of objects in the display interface and identity attributes of each object, such as a name, a corresponding process, content displayed and so on. For example, while a display interface that contains a traffic icon of a traffic measurement ball and a web page of a browser may correspond to display scenario E, a display interface that contains a traffic icon of a traffic measurement ball and a video picture of a video playing application may correspond to display scenario F. For display scenario E and display scenario F, although the number of applications is the same, since each display interface contains display content of different applications with different names or having different processes, that is, the browser and the video playing application are not the same application, display scenario E and display scenario F correspond to different display scenarios.

In one example, the target object may be an object that satisfies user's needs or concerns. In one implementation, a display level for each of the at least two objects can be determined according to identity attributes of each of the at least two objects, and an object with the highest display level can be determined as the target object. For example, when the object is an application, the identity attributes may include a name of the object, a corresponding process, and so on. For another example, when the object is a layer, the identity attributes may include a superimposition sequence of layers and importance of the content displayed by each layer. For instance, in a video playing application, a layer of a video picture is of high importance and a layer of a bullet screen or an advertisement is of low importance. For yet another example, when the object is a display region, the identity attributes may include importance of the content displayed on each display region. For instance, in the video playing application, a display region of the video picture is of high importance and a display region of the advertisement is of low importance. In one example, in the above-described display scenario E and display scenario F, since the traffic measurement ball is generally used to provide users with information on the used traffic that is determined and serves as an assistant, the traffic measurement ball has a lower display level, whereas the browser and the video playing application can realize functions of web browsing and video viewing respectively and thus have a higher display level. As such, in display scenario E, the browser is determined to be the target object, and in display scenario F, the video playing application is determined to be the target object.

In addition, the target object can be determined according to a display area of each of the at least two objects. In general, the display area of each of the at least two objects can be set by the developer in the development stage. Alternatively, the display area of each of the at least two objects can be adjusted by the user. It can be understood that if the user is interested in an object, the object needs to occupy a larger display area to meet the user's needs. Therefore, an object that has the largest display area can be determined as the target object.

At block 102, the number of times display content of a first object being prevented from being displayed in a predetermined period is obtained.

In one implementation, the first object is any object other than the target object in all objects in the first display scenario.

In one example, the predetermined period may be a time period, such as ten hours, one day, two weeks, or one month. Alternatively, the predetermined period may be the number of times. For instance, if the terminal enters the first display scenario ten times, the ten times herein may be the predetermined period. The predetermined period can be set by default or by the user according to actual needs.

Generally, the system may allow the user to forbid display of display content of an object. For example, the user can forbid the display of the display content of an object by clicking "close" or "X" displayed at a certain position such as the top right corner of the object. Since different applications have different design manners, the user may forbid the display of the display content of the different applications in different manners. The disclosure is not limited thereto.

In one example, whether the display of the display content of the first object is forbidden by the user can be detected in real time. If the display content of the first object is prevented from being displayed, the number of times the display content of the first object being prevented from being displayed is increased by one. In the predetermined period, the number of times is accumulated and stored, which can be obtained directly when the operation at block 102 is performed.

At block 103, the display of the display content of the first object is blocked in the first display scenario when the number of times reaches a preset threshold corresponding to the first display scenario.

In one example, the preset threshold corresponding to the first display scenario can be set by default or by the user according to the actual needs. In another example, the preset threshold corresponding to the first display scenario can also be dynamically determined according to a current situation. For example, the preset threshold corresponding to the first display scenario can be determined according to a current time point, so that the user's active forbidding operation can be more targeted. For example, if a time period corresponding to the current time point is in the evening, a first preset threshold is determined to be the preset threshold; if a time period corresponding to the current time point is in the daytime, the second preset threshold is determined to be the preset threshold. In this situation, the first preset threshold is greater than the second preset threshold. Based on this, a relatively high preset threshold can be set, since it is convenient to charge the terminal because the user usually stays at home in the evening. In addition, the preset threshold corresponding to different time points can also be set in advance by the user.

For example, the predetermined period is 7 days and the preset threshold corresponding to the first display scenario is 5 times. In the first display scenario, when the number of times the display content of the first object being prevented from being displayed has reached 5 times in 7 days, the display content of the first object will no longer be displayed in the first display scenario. For yet another example, the predetermined period is 5 times, and the preset threshold corresponding to the first display scenario is 4 times. When the terminal enters the first display scenario up to five times and the display of the display content of the first object is forbidden by the user up to 4 times, then the display content of the first object will no longer be displayed in the first display scenario.

In one implementation, the manner in which the display of the display content of the first object is blocked in the first display scenario is various, which is not limited herein. When the first object is an application, a layer of the first object (first application) is forbidden from being added to a set of layers to be synthesized in the first display scenario. Based on this, the first object can be kept running and complete some corresponding functions. In addition, the first object can quickly return to a normal operation state at the end of display block. In the process of display block, a layer synthesis module does not need to take the layer of the first object into account during display image synthesis, which can increase synthesis speed, thereby improving display efficiency and reducing power consumption. Alternatively, the first object in first display scenario can be closed. In this way, the running of the first object can be stopped, which can also improve the display efficiency and reduce the power consumption. For another example, when the first object is a layer, the first object (first layer) is forbidden from being added to the set of layers to be synthesized in first display scenario, which can accelerate synthesis, thereby improving display efficiency and reducing power consumption. For yet another example, when the first object is a display region, the first object is removed from a layer of the first object in the first display scenario and via a layer synthesis module, (for instance, the layer synthesis module obtains coordinates of the first object, and removes the first object according to the coordinates when performing the layer synthesis, that is, image content within a range of the coordinates of the first object is not synthesized). Alternatively, an application corresponding to the first object is notified to stop rendering the display content of the first object in the layer of the first object. In a practical scenario, a manner of blocking display can be determined with respect to specific display scenarios, application settings, and other factors.

In one implementation, the first object is removed from the layer of the first object in the first display scenario and via the layer synthesis module as follows. Coordinates of first object is obtained in the first display scenario and via the layer synthesis module. The first object is removed according to the coordinates during layer synthesis.

According to the method for controlling display of a terminal, the target object is determined in the first display scenario. The number of times the display content of the first object being prevented from being displayed other than the target object in the predetermined period is obtained. The display of the display content of the first object is blocked in the first display scenario when the number of times reaches the preset threshold corresponding to the first display scenario. In the above manner, the display of the display content of an object can be selectively blocked in a certain display scenario according to user's habits, which can improve the display efficiency of the terminal and reduce the power consumption of the system.

In one implementation, after blocking, in the first display scenario, the display of the display content of the first object, the method further includes the following. The display content of the first object is displayed in the first display scenario upon detecting in the first display scenario that a display recovery event is triggered. In this way, the content blocked can be quickly displayed. In one implementation, the display content of the first object is displayed in the first display scenario upon detecting in the first display scenario that the display recovery event is triggered as follows. Determine that the display recovery event is triggered upon detecting in the first display scenario that a preset button is triggered in a preset manner. The display content of the first object is displayed in the first display scenario according to the display recovery event. In one example, the preset button can be either a physical key on the terminal or a virtual button on a screen. For the physical key, the preset manner can be a press operation, a double-click operation, or a long-press operation. Alternatively, the preset manner can be a combination of press on multiple physical keys, for example, a volume up key (+) and a photo key are pressed at the same time, or the photo key is pressed after a volume down key (−), or the like. For the virtual button, the preset manner can be a click operation, a double-click operation, a long-press operation, or a drag operation. In one example, upon detecting in the display scenario that an option of display recovery of the first object is triggered in an application manager, the display content of the first object is displayed in the first display scenario. The above manners of displaying of the display content of the first object are provided merely for illustrating rather than limiting the disclosure.

In one implementation, the display content of the first object is displayed in the first display scenario, upon detecting in the first display scenario that the display recovery event is triggered as follows. Determine that the display recovery event is triggered upon detecting in the first display scenario that a preset button is triggered in a preset manner. In the first display scenario, the display content of the first object is displayed according to the display recovery event.

Figure 2:
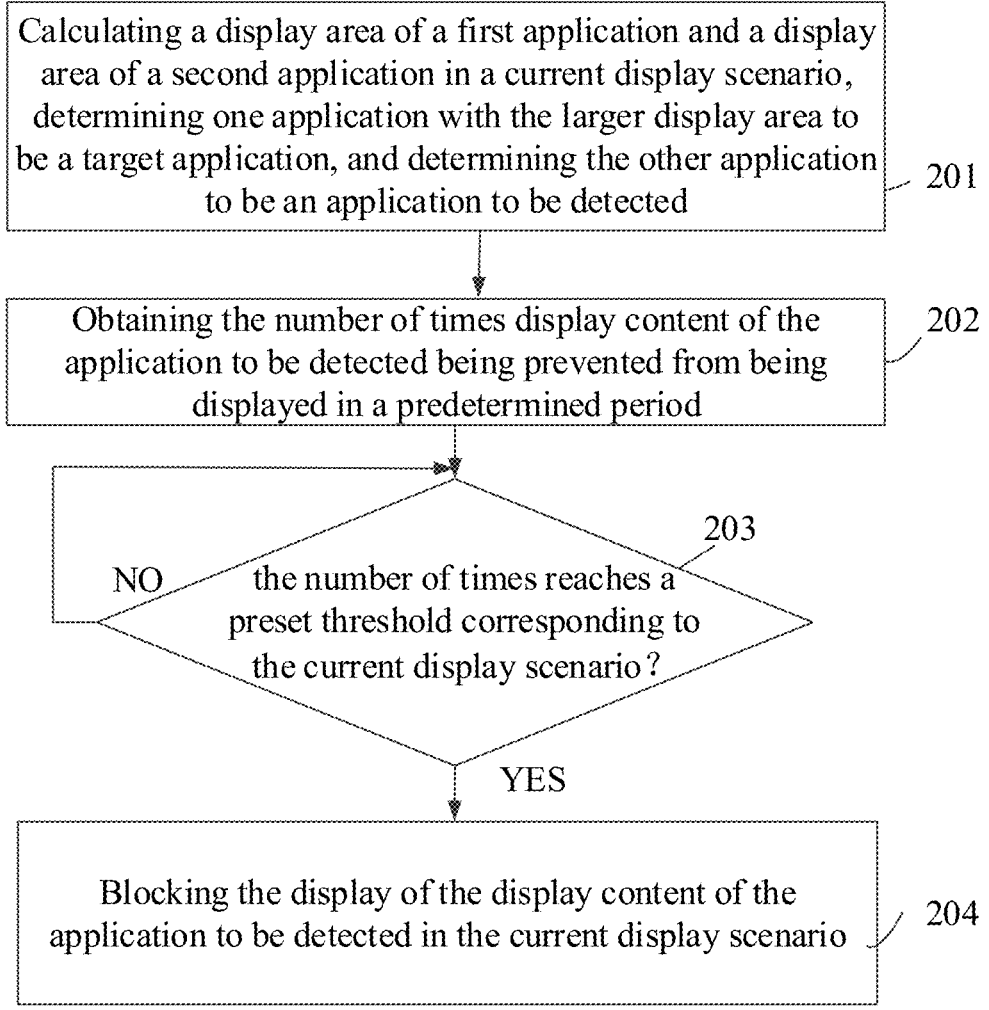
FIG. 2 is a schematic flowchart illustrating a method for controlling display of a terminal according to a second implementation of the disclosure.

FIG. 2 is a schematic flowchart illustrating a method for controlling display of a terminal according to a second implementation of the disclosure. In the method illustrated in FIG. 2, the first display scenario contains display content of two applications. As illustrated in FIG. 2, the method begins at block 201.

At block 201, a display area of a first application and a display area of a second application are respectively calculated in a current display scenario, one application with the larger display area is determined to be a target application, and the other application is determined to be an application to be detected.

Figure 3:
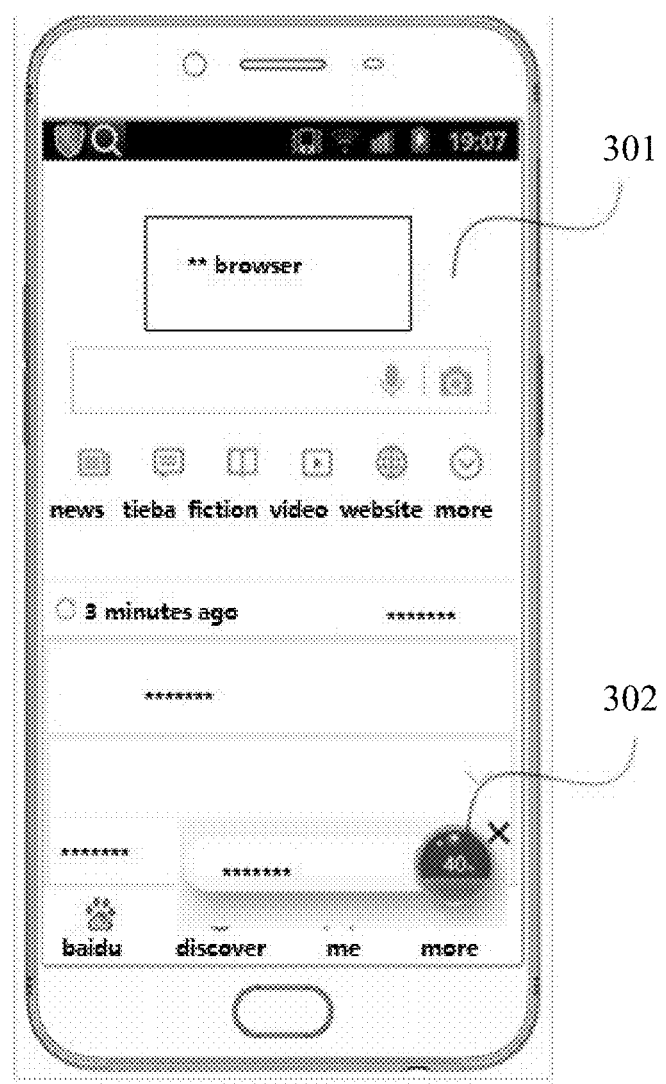
FIG. 3 is a schematic diagram illustrating a display interface of a terminal according to an implementation of the disclosure.

In one example, FIG. 3 is a schematic diagram illustrating a display interface of a terminal according to an implementation of the disclosure. As illustrated in FIG. 3, display scenario E corresponds to a traffic measurement ball (application A) and a browser (application B). Display content of application A is a traffic icon 302 and display content of application B is a web page 301. The web page 301 has a display area larger than that of the traffic icon 302. As such, application B may be determined as the target application and application A may be determined as the application to be detected.

At block 202, the number of times display content of the application to be detected being prevented from being displayed in a predetermined period is obtained.

At block 203, whether the number of times reaches a preset threshold corresponding to the current display scenario is determined, and if yes, proceed to operations at block 204, otherwise, return to operations at block 202.

In one example, the preset threshold corresponding to different display scenarios can be the same or different. For example, display scenario F corresponds to a traffic measurement ball (application A) and a video playing application (application C), application C is determined to be the target application, and application A is determined to be the application to be detected. Since the traffic icon of the traffic measurement ball may occlude a video picture, the preset threshold corresponding to display scenario F can be set to be less than that corresponding to the display scenario E.

At block 204, the display of the display content of the application to be detected is blocked in the current display scenario.

Figure 4:
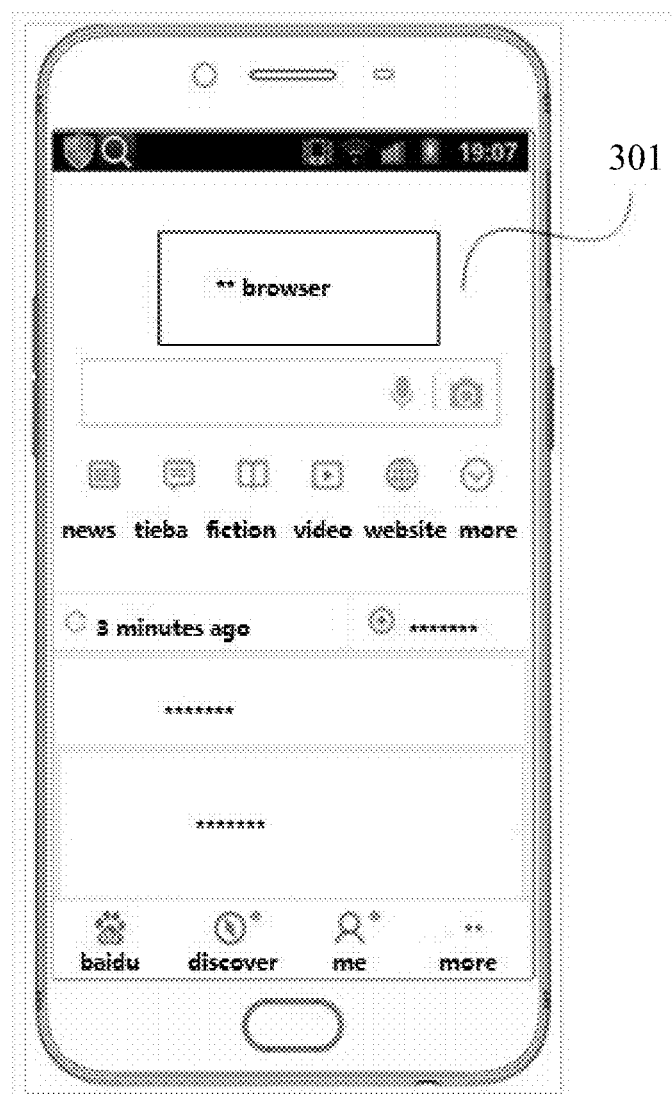
FIG. 4 is a schematic diagram illustrating a display interface of a terminal according to another implementation of the disclosure.

FIG. 4 is a schematic diagram illustrating a display interface of a terminal according to another implementation of the disclosure. As illustrated in FIG. 4, when the number of times the traffic icon 302 of the traffic measurement ball being prevented from being displayed reaches the preset threshold corresponding to the current display scenario, the terminal may automatically block, in the current display scenario, the display of the traffic icon 302 and a layer synthesis module does not need to synthesize a layer of the traffic icon 302 into a display image, which can increase layer synthesis speed, improve display efficiency, and reduce power consumption, thereby further satisfying users' needs.

According to the method for controlling the display of a terminal, the display of the display content of an application can be blocked in a certain display scenario according to user's habits, which can improve the display efficiency of the terminal and reduce the power consumption of the system.

In another example, a layer or a display region rather than an application may be taken as an example. For example, in a video playing display scenario, when the number of times the use closes a layer of a bullet screen reaches a corresponding preset threshold, display of the layer of the bullet screen can be automatically blocked. For another example, in the video playing display scenario, when the number of times the user closes a display region of an advertisement reaches a corresponding preset threshold, display of the display region of the advertisement can be automatically blocked. The process is similar to the above technical solution corresponding to the applications, which will not be described in detail herein again.

Figure 5:
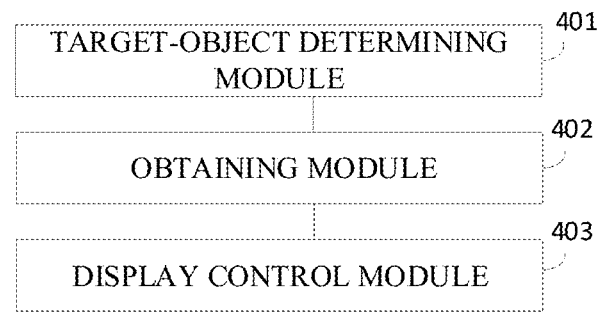
FIG. 5 is a structural block diagram illustrating an apparatus for controlling display of a terminal according to an implementation of the disclosure.
Figure 6:
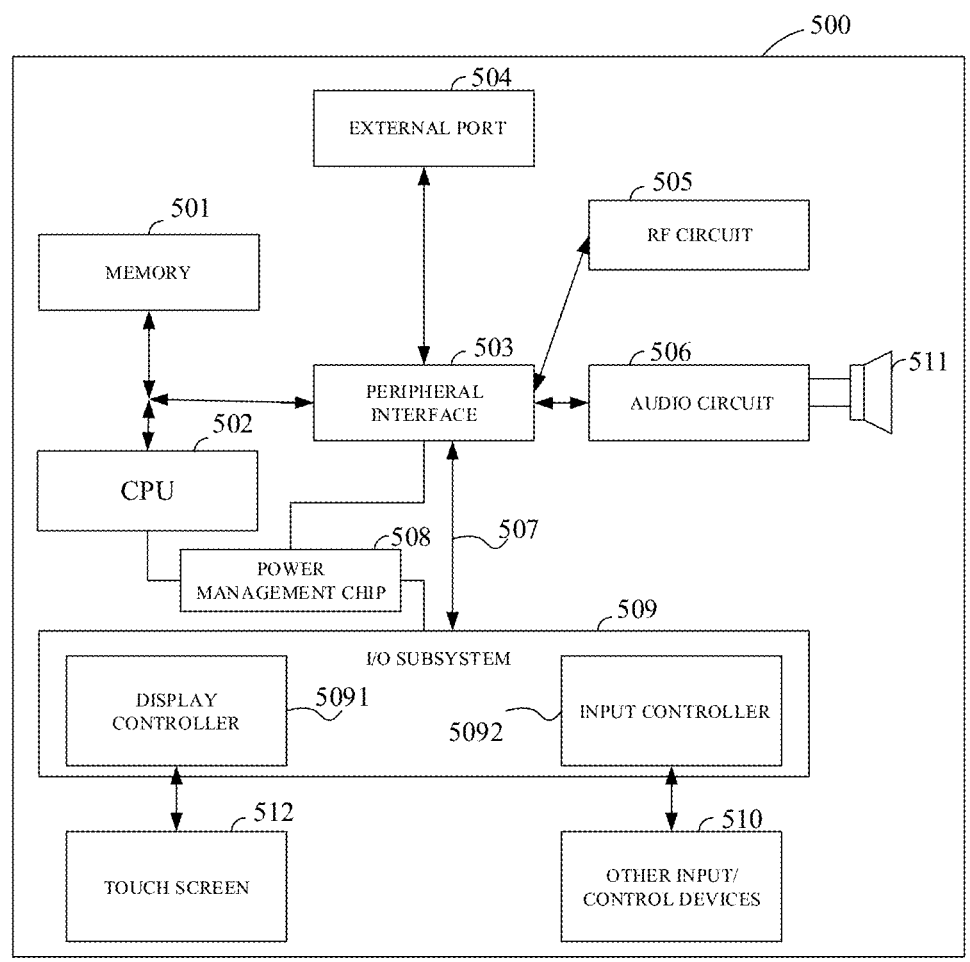
FIG. 6 is a schematic structural diagram illustrating a terminal according to an implementation of the disclosure.

FIG. 5 is a structural block diagram illustrating an apparatus for controlling display of a terminal according to an implementation of the disclosure. The apparatus can be implemented with software and/or hardware and can generally be integrated into the terminal. The display of the terminal can be controlled by performing the method for controlling the display of the terminal. As illustrated in FIG. 5, the apparatus includes a target-object determining module 401, an obtaining module 402, and a display control module 403. The target-object determining module 401 is configured to determine, in a first display scenario, a target object, where the first display scenario contains display content of at least two objects, and each of the at least two objects includes an application, a layer, or a display region. The obtaining module 402 is configured to obtain the number of times display content of a first object being prevented from being displayed in a predetermined period, where the first object is any object other than the target object in all objects in the first display scenario. The display control module 403 is configured to block, in the first display scenario, the display of the display content of the first object when the number of times reaches a preset threshold corresponding to the first display scenario.

According to the apparatus for controlling the display of the terminal, the display of the display content of an application can be selectively blocked in a certain display scenario according to user's habits, which can improve the display efficiency of the terminal and reduce the power consumption of the system.

In one implementation, the target-object determining module 401 is configured to determine, in the first display scenario, a display level for each of the at least two objects in the first display scenario according to identity attributes of each of the at least two objects and to determine an object with the highest display level as the target object, or to calculate, in the first display scenario, a display area of each of the at least two objects in the first display scenario and to determine an object with the largest display area as the target object.

In one implementation, the display control module 403 includes a preset threshold determining unit configured for the first display scenario and a display control unit. The preset threshold determining unit is configured to determine, according to a current time point, the preset threshold corresponding to the first display scenario. The display control unit is configured to block, in the first display scenario, the display of the display content of the first object when the number of times reaches the preset threshold corresponding to the first display scenario.

In one implementation, the display control unit is configured to forbid, in the first display scenario, a layer of the first object from being added to a set of layers to be synthesized or close the first object in the first display scenario, when the first object is an application; forbid, in the first display scenario, the first object from being added to the set of layers to be synthesized, when the first object is a layer; or remove, in the first display scenario and via a layer synthesis module, the first object from a layer of the first object or notify an application corresponding to the first object to stop rendering the display content of the first object in the layer of the first object, when the first object is a display region.

In one implementation, after blocking, in the first display scenario, the display of the display content of the first object, the display control module 403 is further configured to display the display content of the first object in the first display scenario, upon detecting in the first display scenario that a display recovery event is triggered.

In one example, the display control module 403 is configured to obtain, in the first display scenario and via the layer synthesis module, coordinates of the first object and remove the first object according to the coordinates during layer synthesis.

In one example, the display control module 403 is further configured to: determine that the display recovery event is triggered, upon detecting in the first display scenario that a preset button is triggered in a preset manner; display, in the first display scenario, the display content of the first object according to the display recovery event.

Implementations of the disclosure also provide a computer readable storage medium. The computer readable storage medium is configured to store computer programs which, when executed by a computer, are operable with the computer to accomplish all or part of the operations of any of the methods for controlling display of a terminal according to implementations of the disclosure.

In implementations of the disclosure, a terminal is provided. The apparatus for controlling the display of the terminal can be integrated into the terminal. FIG. 5 is a schematic structural diagram illustrating a terminal according to an implementation of the disclosure. As illustrated in FIG. 5, the terminal includes a casing (not illustrated), a memory 501, a central processing unit (CPU) 502 (also referred as a processor, referred as CPU hereinafter), a circuit board (not illustrated), and a power supply circuit (not illustrated). The circuit board is disposed inside a space defined by the casing. The CPU 502 and the memory 501 are disposed on the circuit board. The power supply circuit is configured to supply power to each circuit or component of the terminal. The memory 501 is configured to store executable program codes. The CPU 502 is configured to run a computer program corresponding to the executable program codes by reading out the executable program codes stored in the memory 501 to determine, in a first display scenario, a target object, wherein the first display scenario contains display content of at least two objects, and each of the at least two objects comprises an application, a layer, or a display region; obtain the number of times display content of a first object being prevented from being displayed in a predetermined period, where the first object is any object other than the target object in all objects in the first display scenario; block, in the first display scenario, the display of the display content of the first object when the number of times reaches a preset threshold corresponding to the first display scenario.

The terminal further includes a peripheral interface 503, a radio frequency (RF) circuit 505, an audio circuit 506, a speaker 511, a power management chip 508, an input/output (I/O) subsystem 509, other input/control devices 510, a touch screen 512, and an external port 504, which are communicated via one or more communication buses or signal lines 507.

It should be understood that the terminal 500 illustrated is merely an example. The terminal 500 may have more or fewer components than those illustrated. For example, two or more components may be combined, or different component configurations can be adopted in the terminal. The various components illustrated can be implemented in hardware, software, or a combination of hardware and software including one or more signal processing and/or application specific integrated circuits.

The following will describe a terminal for display control in detail, and a mobile phone will be taken as an example.

The memory 501 can be accessed by the CPU 502, the peripheral interface 503, and so on. The memory 501 may include a high-speed random access memory and may further include a non-transitory memory such as one or more magnetic disk storage devices, flash memory devices, or other volatile solid-state memory devices.

The peripheral interface 503 is configured to connect the input and output peripherals of the apparatus to the CPU 502 and the memory 501.

The I/O subsystem 509 can be configured to connect the input and the output peripherals, such as the touch screen 512 and other input/control devices 510, to the peripheral interface 503. The I/O subsystem 509 may include a display controller 5091 and one or more input controllers 5092 configured to control other input/control devices 510. One or more input controllers 5092 are configured to receive electrical signals from or send electrical signals to other input/control devices 510, where other input/control devices 510 may include a physical button (a press button, a rocker button, etc.), a dial, a slide switch, a joystick, or a click wheel. It should be noted that the input controller 5092 can be coupled with any of a keyboard, an infrared port, a USB interface, and a pointing apparatus such as a mouse.

The touch screen 512 is an input interface and an output interface between the terminal and a user and is configured to display a visual output to the user. The visual output may include graphics, text, icons, videos, and the like.

The display controller 5091 in the I/O subsystem 509 is configured to receive an electrical signal from or send an electrical signal to the touch screen 512. The touch screen 512 is configured to detect contact on the touch screen, and the display controller 5091 is configured to convert the contact detected into an interaction with a user interface object displayed on the touch screen 512, that is, to realize human-computer interaction. The user interface object displayed on the touch screen 512 may be an icon of a running game, an icon indicating connection to corresponding networks, and the like. It should be noted that the device may also include a light mouse, which is a touch sensitive surface that does not display a visual output, or can be an extension of a touch sensitive surface formed by the touch screen.

The RF circuit 505 is configured to establish communication between a mobile phone and the wireless network (i.e. network side) to achieve data reception and transmission between the mobile phone and the wireless network, for example, reception and transmission of short messages, emails, and the like. The RF circuit 505 is configured to receive and transmit RF signals (which is also known as electromagnetic signals), to convert an electrical signal into an electromagnetic signal or convert an electromagnetic signal into an electrical signal, and to communicate with a communication network and other devices through the electromagnetic signal. The RF circuit 505 may include known circuits for performing these functions, and the known circuits include but are not limited to an antenna system, an RF transceiver, one or more amplifiers, a tuner, one or more oscillators, a digital signal processor, a coder-decoder (codec) chipset, a subscriber identity module (SIM), and so on.

The audio circuit 506 is configured to receive audio data from the peripheral interface 503, to convert the audio data into an electrical signal, and to transmit the electrical signal to the speaker 511.

The speaker 511 is configured to restore the voice signal received by the mobile phone from the wireless network via the RF circuit 505 to sound and to play the sound to the user.

The power management chip 508 is configured for power supply and power management of the hardware connected to the CPU 502, the I/O subsystem 509, and the peripheral interfaces 503.

With aid of the terminal provided herein, the display of the display content of an object can be selectively blocked in a certain display scenario according to the user's habits, thereby improving display efficiency of the terminal and reducing system power consumption.

In an implementation of the disclosure, an electronic device is provided. The electronic device includes a memory, and a processor. The processor is configured to invoke computer programs stored in the memory to perform operations in the method for controlling display of a terminal provided by implementations of the disclosure.

Figure 7:
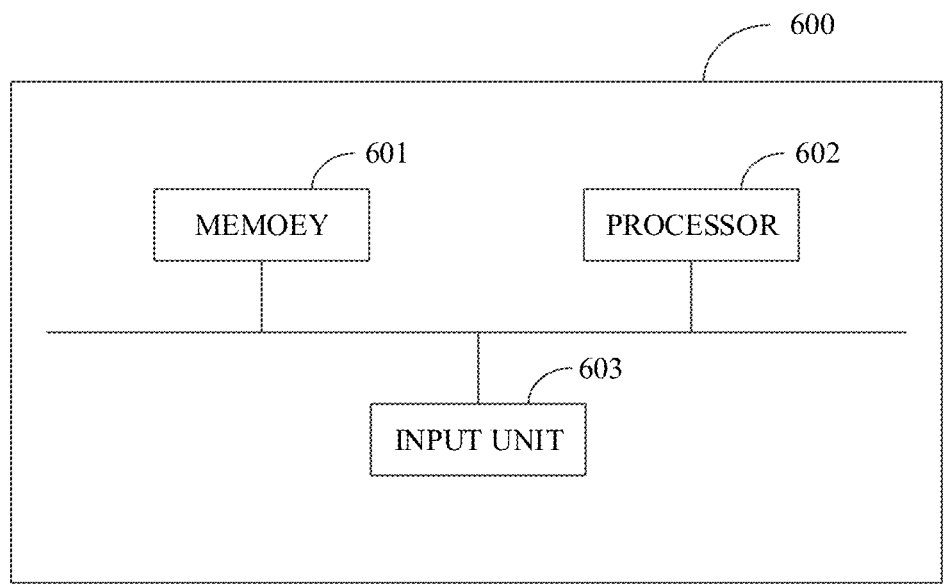
FIG. 7 is a schematic structural diagram illustrating an electronic device according to an implementation of the disclosure.

For example, the electronic device can be a terminal such as a smart phone or a tablet computer. FIG. 7 is a schematic structural diagram of an electronic device according to an implementation of the disclosure. The electronic device 600 can include components such as a memory 601, a processor 602, and a display screen.

The memory 601 is configured to store software programs and data. The software programs stored in memory 601 contains executable codes. Software programs can form various functional modules. The processor 602 is configured to execute various function applications and data processing of the mobile phone by running the software programs stored in the memory 601.

The processor 602 is a control center of the electronic device. The processor 602 is configured to connect various parts of the entire electronic device through various interfaces and lines, and to execute various functions of the electronic device and process data by running or executing software programs stored in the memory 601 and invoking data stored in the memory 601, thereby monitoring the electronic device as a whole.

The electronic device further includes an input unit 603. The input unit 603 may be configured to receive input digital or character information or user feature information (such as fingerprints) and to generate keyboard, mouse, lever, and optical or trajectory ball signal input related to user settings and functional control. In one example, the input unit 603 may include a touch sensitive surface and other input devices. The touch sensitive surface is also known as touch screen or touch panel.

In this example, the processor 602 in the electronic device applies the executable code corresponding to the process of one or more applications to memory 601 according to the following instructions, and runs the application stored in memory 601 by the processor 602, thereby performing the following operations. A target object is determined in a first display scenario, where the first display scenario contains display content of at least two objects, and each of the at least two objects includes an application, a layer, or a display region. The number of times display content of a first object being prevented from being displayed in a predetermined period is obtained, where the first object is any object other than the target object in all objects in the first display scenario. The display of the display content of the first object is blocked in the first display scenario, when the number of times reaches a preset threshold corresponding to the first display scenario.

In one implementation, the processor configured to determine, in the first display scenario, the target object is configured to: determine, in the first display scenario, a display level for each of the at least two objects in the first display scenario according to identity attributes of each of the at least two objects and determine an object with the highest display level as the target object; or calculate, in the first display scenario, a display area of each of the at least two objects in the first display scenario and determine an object with the largest display area as the target object.

In one implementation, the processor configured to block, in the first display scenario, the display of the display content of the first object when the number of times reaches the preset threshold corresponding to the first display scenario is configured to: determine, according to a current time point, the preset threshold corresponding to the first display scenario; block, in the first display scenario, the display of the display content of the first object when the number of times reaches the preset threshold corresponding to the first display scenario.

In one implementation, the processor configured to block, in the first display scenario, the display of the display content of the first object is configured to: forbid, in the first display scenario, a layer of the first object from being added to a set of layers to be synthesized or close the first object in the first display scenario, when the first object is an application; forbid, in the first display scenario, the first object from being added to the set of layers to be synthesized, when the first object is a layer; or remove, in the first display scenario and via a layer synthesis module, the first object from a layer of the first object or notify an application corresponding to the first object to stop rendering the display content of the first object in the layer of the first object, when the first object is a display region.

In one implementation, after blocking, in the first display scenario, the display of the display content of the first object, the processor is further configured to: display the display content of the first object in the first display scenario, upon detecting in the first display scenario that a display recovery event is triggered.

In one implementation, the processor configured to remove, in the first display scenario and via the layer synthesis module, the first object from the layer of the first object is configured to: obtain, in the first display scenario and via the layer synthesis module, coordinates of the first object and remove the first object according to the coordinates during layer synthesis.

In one implementation, the processor configured to display the display content of the first object in the first display scenario, upon detecting in the first display scenario that the display recovery event is triggered is configured to: determine that the display recovery event is triggered, upon detecting in the first display scenario that a preset button is triggered in a preset manner; display, in the first display scenario, the display content of the first object according to the display recovery event.

Figure 8:
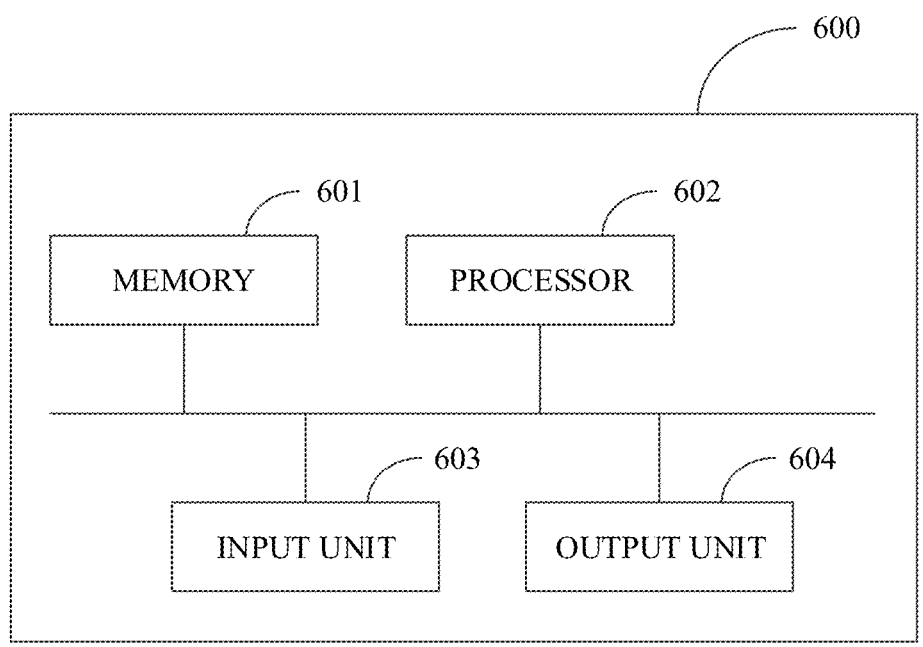
FIG. 8 is a schematic structural diagram illustrating an electronic device according to another implementation of the disclosure.

Those skilled in the art will be understood that, the electronic device illustrated in FIG. 7 is an example rather than limited to the disclosure. The electronic device may have more or fewer components, or may combine certain components, or may adopt different component configurations. In one example, as illustrated in FIG. 8, the electronic device 600 may further include an output unit 604 and so on.

The output unit 604 is configured to display information input by the user or provided to the user as well as various graphical user interfaces of the terminal, which can be composed of graphics, text, icons, videos, and any combination thereof. For example, the output unit 604 may be a display panel.

It can be understood by those of ordinary skill in the art that all or part of the operations in the various methods of the above implementations may be achieved by a program instructing related hardware. The program can be stored in a computer readable storage medium. The computer readable storage medium may include a read only memory (ROM), a random access memory (RAM), a disk or a compact disc, and so on.

The apparatus for controlling display of a terminal and the terminal provided in the above implementations can execute the method for controlling display of a terminal provided in any implementation of the disclosure and have functional modules for executing the method and advantages of the method. For technical details not described in detail in the above implementations, reference can be made to the method for controlling display of the terminal provided in any implementation of the disclosure.

It should be noted that the above implementations are merely example implementations of the disclosure and technical principles applied thereto. Those skilled in the art should understand that the disclosure is not limited to the specific implementations described herein, and various obvious changes, re-modifications and substitutions can be made by those skilled in the art without departing from the scope of the disclosure. Therefore, although the disclosure has been described in detail in connection with the above implementations, the disclosure is not limited to the above implementations and other equivalent implementations may be included without departing from the concept of the disclosure. However, the scope of the disclosure shall be subject to the scope of the appended claims.

What is claimed is:

1. A method for controlling display of a terminal, comprising:
    calculating, in a first display scenario, a display area of each of at least two objects in the first display scenario;
    determining, in the first display scenario, an object with the largest display area as a target object, wherein the first display scenario contains display content of the at least two objects, and each of the at least two objects comprises an application, a layer, or a display region;
    obtaining the number of times display content of a first object being prevented from being displayed in a predetermined period, wherein the first object is any object other than the target object in all objects in the first display scenario;
    determining, according to a current time and relationships between time periods of a day and preset thresholds, a preset threshold corresponding to the first display scenario, wherein the preset thresholds are different from one another; and
    blocking, in the first display scenario, the display of the display content of the first object when the number of times reaches the preset threshold corresponding to the first display scenario.

2. The method of claim 1, wherein blocking, in the first display scenario, the display of the display content of the first object comprises:
    forbidding, in the first display scenario, a layer of the first object from being added to a set of layers to be synthesized or closing the first object in the first display scenario, when the first object is an application.

3. The method of claim 1, wherein blocking, in the first display scenario, the display of the display content of the first object comprises:
forbidding, in the first display scenario, the first object from being added to the set of layers to be synthesized, when the first object is a layer.

4. The method of claim 1, wherein blocking, in the first display scenario, the display of the display content of the first object comprises:
removing, in the first display scenario and via a layer synthesis module, the first object from a layer of the first object or notifying an application corresponding to the first object to stop rendering the display content of the first object in the layer of the first object, when the first object is a display region.

5. The method of claim 4, wherein removing, in the first display scenario and via the layer synthesis module, the first object from the layer of the first object comprises:
obtaining, in the first display scenario and via the layer synthesis module, coordinates of the first object and removing the first object according to the coordinates during layer synthesis.

6. The method of claim 1, further comprising:
displaying the display content of the first object in the first display scenario, upon detecting in the first display scenario that a display recovery event is triggered.

7. The method of claim 6, wherein displaying the display content of the first object in the first display scenario, upon detecting in the first display scenario that the display recovery event is triggered comprises:
determining that the display recovery event is triggered, upon detecting in the first display scenario that a preset button is triggered in a preset manner; and
displaying, in the first display scenario, the display content of the first object according to the display recovery event.

8. An electronic device, comprising:
a memory; and
a processor, configured to invoke computer programs stored in the memory to:
calculate, in a first display scenario, a display area of each of at least two objects in the first display scenario;
determine, in the first display scenario, an object with the largest display area as a target object, wherein the first display scenario contains display content of the at least two objects, and each of the at least two objects comprises an application, a layer, or a display region;
obtain the number of times display content of a first object being prevented from being displayed in a predetermined period, wherein the first object is any object other than the target object in all objects in the first display scenario;
determine, according to a current time and relationships between time periods of a day and preset thresholds, a preset threshold corresponding to the first display scenario, wherein the preset thresholds are different from one another; and
block, in the first display scenario, the display of the display content of the first object when the number of times reaches a preset threshold corresponding to the first display scenario.

9. The electronic device of claim 8, wherein the processor is configured to invoke the computer programs stored in the memory to:
forbid, in the first display scenario, a layer of the first object from being added to a set of layers to be synthesized or close the first object in the first display scenario, when the first object is an application.

10. The electronic device of claim 8, wherein the processor is configured to invoke the computer programs stored in the memory to:
forbid, in the first display scenario, the first object from being added to the set of layers to be synthesized, when the first object is a layer.

11. The electronic device of claim 8, wherein the processor is configured to invoke the computer programs stored in the memory to:
remove, in the first display scenario and via a layer synthesis module, the first object from a layer of the first object or notify an application corresponding to the first object to stop rendering the display content of the first object in the layer of the first object, when the first object is a display region.

12. The electronic device of claim 11, wherein the processor is configured to invoke the computer programs stored in the memory to:
obtain, in the first display scenario and via the layer synthesis module coordinates of the first object, and remove the first object according to the coordinates during layer synthesis.

13. The electronic device of claim 8, wherein the processor is further configured to invoke computer programs stored in the memory to:
display the display content of the first object in the first display scenario, upon detecting in the first display scenario that a display recovery event is triggered.

14. The electronic device of claim 13, wherein the processor is configured to invoke the computer programs stored in the memory to:
determine that the display recovery event is triggered, upon detecting in the first display scenario that a preset button is triggered in a preset manner; and
display, in the first display scenario, the display content of the first object according to the display recovery event.

15. A non-transitory computer readable storage medium, configured to store computer programs which, when executed by a computer, are operable with the computer to:
calculate, in a first display scenario, a display area of each of at least two objects in the first display scenario;
determine, in the first display scenario, an object with the largest display area as a target object, wherein the first display scenario contains display content of the at least two objects, and each of the at least two objects comprises an application, a layer, or a display region;
obtain the number of times display content of a first object being prevented from being displayed in a predetermined period, wherein the first object is any object other than the target object in all objects in the first display scenario;
determine, according to a current time and relationships between time periods of a day and preset thresholds, a preset threshold corresponding to the first display scenario, wherein the preset thresholds are different from one another; and
block, in the first display scenario, the display of the display content of the first object when the number of times reaches the preset threshold corresponding to the first display scenario.

* * * * *